June 26, 1928.

A. S. VALENTINE 1,674,750

ANIMAL RACING APPARATUS

Filed Jan. 7, 1927

Inventor
ALFRED S. VALENTINE
By his Attorneys
Sheffield & Betts

Patented June 26, 1928.

1,674,750

UNITED STATES PATENT OFFICE.

ALFRED S. VALENTINE, OF BROOKLYN, NEW YORK.

ANIMAL-RACING APPARATUS.

Application filed January 7, 1927. Serial No. 159,582.

This invention relates to animal racing apparatus and more particularly to the apparatus employed to facilitate the racing of dogs on a race course where they pursue an artificial lure, preferably in the form of a rabbit.

The principal object of this invention is to provide means whereby the mechanical rabbit or other form of lure employed may pass through an obstruction placed across the race track at one or more points. Such obstructions may include one or more hurdles over which the dogs are forced to leap or may consist only of a gate positioned beyond the finish line of the race track to effect the escape or disappearance of the lure from the dogs and to offer a solid barrier to the dogs in order to induce them to run off the race track, as shown in the accompanying drawing.

Further objects of the invention will be apparent from the following description from which my invention will be fully understood when taken in connection with the accompanying drawing and the scope of the invention will be pointed out in the appended claims.

In my co-pending application, Serial No. 153,910, filed December 10, 1926, I have shown one means of effecting the escape of the lure and the present application describes another form of gate or other obstruction provided with an opening therein covered by flexible material through which the lure may readily pass.

In the drawing illustrating a preferred form of my invention,

Figure 1:
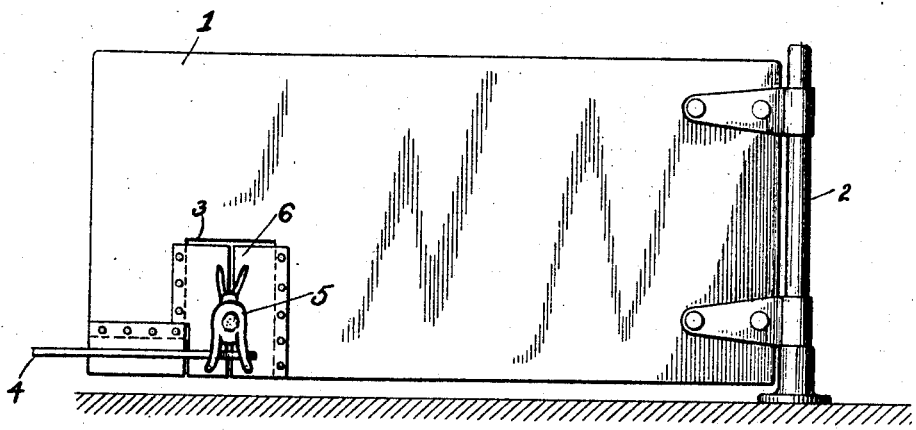
Fig. 1 is a side elevation of a gate or other obstruction embodying my invention and adapted to be placed across the race track.
Figure 2:
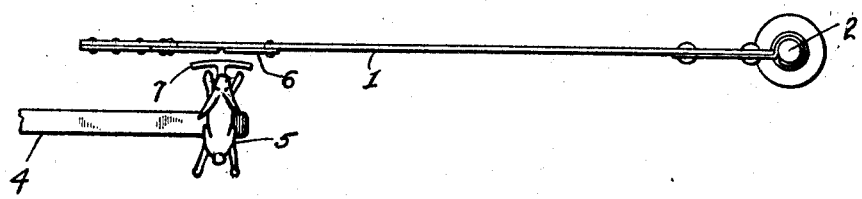
Fig. 2 is a plan view thereof.

In the drawing the numeral 1 indicates an obstruction such as a gate adapted to lead the dogs off the race track as described in the application above mentioned, or it may be used as a hurdle over which the dogs are forced to leap. The obstruction 1, hereinafter referred to for convenience only as the gate, may be and preferably is hinged to a post 2 set in the ground adjacent the outer edge of the race track.

The lower portion of the gate 1 adjacent the inner edge of the race track is recessed as shown at 3. This recess is so positioned with respect to the race track and is of such shape that the lure support 4 and the lure 5 carried thereon may readily pass therethrough.

The lure may be and preferably is driven by means such as disclosed in my said prior application or it may be carried around the track in any other suitable or preferred way.

Figure 3:
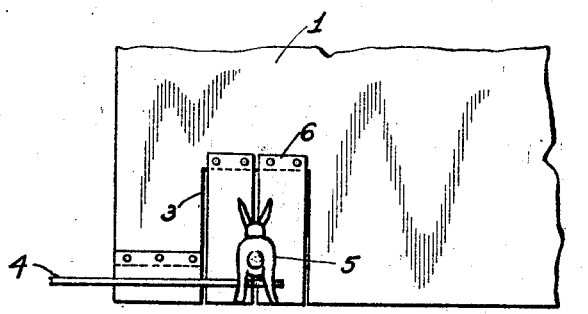
Fig. 3 is a partial side elevation showing one form of flexible covering for the opening in the obstruction.

To prevent the dogs from following the lure through the opening 3, the opening is covered by sheets of flexible material 6. These sheets may be made of leather, canvas, paper, gauze or other flexible material. In the preferred form shown in Fig. 1, the sheets are fastened by nails or other means to the gate 1, as shown. Another manner of fastening the sheets of flexible material in place is illustrated in Fig. 3.

In order to prevent damage being done to the lure 5 while it is passing through the opening 3 a projection 7 is preferably fastened to the lure carrying arm 4 and may be of the form shown in order to displace the sheets of flexible material covering the opening 3 without allowing them to come into contact with the head of the lure.

Having thus described this form of my invention, I do not wish to be understood as being limited to the details of form and arrangement of the parts set forth, for various changes may be made by those skilled in the art without departing from the spirit and scope of my invention.

What I claim and desire to protect by Letters Patent is:

1. In animal racing apparatus, comprising a race track or course and a mechanically driven lure, in combination with an obstruction adapted to be placed across said race track and having an opening therein through which the lure may pass, flexible means covering said opening and adapted to be deflected by the passing of said lure.

2. In animal racing apparatus, comprising a race track or course and a mechanically driven lure, in combination with an obstruction adapted to be placed across said race track and having an opening therein through which the lure may pass, flexible means adapted to cover said opening secured to said obstruction adjacent the edges of said opening and adapted to be deflected by the passing of said lure.

3. In animal racing apparatus, comprising a race track or course and a mechanically driven lure, in combination with an obstruction adapted to be placed across said race track and having an opening therein through which the lure may pass, sheets of flexible material adapted to cover said opening secured to said obstruction adjacent the edges of said opening and adapted to be deflected by the passing of said lure through said opening.

4. In animal racing apparatus, comprising a race track or course and a mechanically driven lure, in combination with a vertically hinged obstruction adapted to be placed across said race track and having an opening therein through which the lure may pass, flexible means adapted to cover said opening and adapted to be deflected by the passing of said lure through said opening.

5. In animal racing apparatus, comprising a race track or course, a mechanically driven support and a lure carried thereon, in combination with an obstruction adapted to be placed across said race track and having an opening therein through which the support and lure may pass, flexible means adapted to cover said opening secured to said obstruction adjacent the edges of said opening and projecting means carried by said support adapted to displace said flexible means during the passing of said lure through said opening.

6. In animal racing apparatus, comprising a race track or course, a mechanically driven support and a lure carried thereon, in combination with an obstruction adapted to be placed across said race track having an opening therein through which the support and lure may pass, sheets of flexible material adapted to cover said opening secured to said obstruction adjacent the edges of said opening and adapted to permit the support and the lure to pass through said opening and means carried by said support adapted to displace said sheets during the passing of said lure through said opening.

7. In animal racing apparatus, comprising a race track or course, a mechanically driven support and a lure carried thereon, in combination with a vertically hinged obstruction adapted to be placed across said race track and having an opening therein through which the support and lure may pass, sheets of flexible material adapted to cover said opening secured to said obstruction adjacent the edges of said opening and adapted to permit the support and the lure to pass through said opening, and means carried by said support adapted to displace said sheets during the passing of said lure through said opening.

Signed this 3rd day of January, 1927.

ALFRED S. VALENTINE.